(12) United States Patent
Whitt

(10) Patent No.: US 12,020,203 B2
(45) Date of Patent: Jun. 25, 2024

(54) SYSTEM AND METHOD FOR TAKING ASSET INVENTORY ACROSS A WIDE AREA

(71) Applicant: WIRELESS DATA SYSTEMS, INC., Boca Raton, FL (US)

(72) Inventor: P. David Whitt, Boca Raton, FL (US)

(73) Assignee: WIRELESS DATA SYSTEMS, INC., Boca Raton, FL (US)

( * ) Notice: Subject to any disclaimer, the term of this patent is extended or adjusted under 35 U.S.C. 154(b) by 297 days.

(21) Appl. No.: 17/368,315

(22) Filed: Jul. 6, 2021

(65) Prior Publication Data
US 2022/0019963 A1 Jan. 20, 2022

Related U.S. Application Data

(60) Provisional application No. 63/054,061, filed on Jul. 20, 2020.

(51) Int. Cl.
G06Q 10/087 (2023.01)
B64C 39/02 (2023.01)
B64D 47/08 (2006.01)
G05D 1/00 (2006.01)
H04W 4/021 (2018.01)
B64U 101/30 (2023.01)

(52) U.S. Cl.
CPC ......... *G06Q 10/087* (2013.01); *B64C 39/024* (2013.01); *B64D 47/08* (2013.01); *G05D 1/101* (2013.01); *H04W 4/021* (2013.01); *B64U 2101/30* (2023.01); *B64U 2201/104* (2023.01)

(58) Field of Classification Search
CPC .... G06Q 10/087; B64C 39/024; B64D 47/08; G05D 1/101; G05D 1/0094; H04W 4/021; H04W 4/35; B64U 2101/30; B64U 2201/104; B64U 2101/00; B64U 10/13; B64U 2101/26
USPC .......................................................... 705/28
See application file for complete search history.

(56) References Cited

U.S. PATENT DOCUMENTS

| 11,395,095 | B2* | 7/2022 | Jones | G06F 16/29 |
|---|---|---|---|---|
| 2013/0063251 | A1* | 3/2013 | Allen | G06Q 10/0833 340/10.1 |
| 2017/0303082 | A1* | 10/2017 | Jones | H04L 67/52 |
| 2022/0044533 | A1* | 2/2022 | Branscomb | H04W 4/021 |
| 2023/0053257 | A1* | 2/2023 | Jones | G06F 16/951 |

* cited by examiner

*Primary Examiner* — Garcia Ade
(74) *Attorney, Agent, or Firm* — Howard M. Gitten, Esq.; Lewis Brisbois Bisgaard & Smith LLP

(57) ABSTRACT

A system for taking inventory over a wide area includes a database. The database stores a geofenced area divided into two or more waypoints and a route defined as path within the geofenced area across at least two waypoints. At least one mobile asset is disposed at a position in a yard corresponding to the at least one waypoint. The mobile asset has a readable tag having information about the asset thereon. An aerial vehicle having a tag reader flies along the route within the geofenced area for communicating with each tag along a route, reading the information and storing the information read from each tag.

13 Claims, 4 Drawing Sheets

SYSTEM AND METHOD FOR TAKING ASSET INVENTORY ACROSS A WIDE AREA

CROSS REFERENCE TO RELATED APPLICATIONS

This application claims priority to U.S. Provisional Patent Application No. 63/054,061, filed Jul. 20, 2020 and titled "SYSTEM AND METHOD FOR TAKING ASSET INVENTORY ACROSS A WIDE AREA;" the contents of which are incorporated herein in its entirety.

BACKGROUND OF THE INVENTION

The present invention is directed to a system and method for taking asset inventory, and more particularly, a structure for taking asset inventory over a large physical area.

It is well known in the art to take asset inventory using a scanner; either optical or RFID based. these scanners enable a user to manually place a reader in proximity to the object being inventoried, read a tag physically thereon and record the existence of the inventoried item. The identification, or counting, of the asset of interest is then transmitted to a central processor which accumulates the identification of like assets to provide an overall count of assets; an inventory. The information can be accumulated from several readers operated by different individuals at different times.

It is also known in the art to provide a tag on the shelf or rack so that upon scanning of the shelf tag, an indication of the relative physical location of the scanned item to the physical location of a rack is known. This pairing of rack and item may also be stored locally, and is capable of being agglomerated as part of an overall inventory.

This prior art system has been satisfactory, however while it lends itself to inventory taking in predictable environments such as a warehouse, it suffers from the disadvantage that it is time consuming as it requires manpower to operate. It also suffers from human error. These short comings only become compounded if the area to be inventoried is large and there is distance between assets; more manpower and/or time is required to inventory the same number of assets. Also if the asset is in a particularly difficult position to manually reach, it becomes hard, if not sometimes impossible to manually take the inventory of such an object.

The manual methodology has been particularly lacking for heavy duty mobile equipment such as tractors, trucks, cranes, and the like which are kept outside, move around relative to a defined area, have no rack or shelf infrastructure to identify position within the yard and are often hard to reach for reading/counting if the lot is full and the equipment is penned in behind other equipment. Accordingly, a system for taking inventory over a wide area which overcomes the shortcomings of the prior art is desired.

SUMMARY OF THE INVENTION

The present invention relates to a system and method for taking inventory of mobile assets across a wide area. The system includes a database. The database stores the parameters of a geofenced area divided into two or more waypoints. The database also stores a route defined as a path within the geofenced area across two or more waypoints. At least one mobile asset is disposed at a position in a yard corresponding to at least one waypoint. The mobile asset has a readable tag having information about the asset thereon. An aerial vehicle having a tag reader flies along the route within the geofenced area for communicating with each tag along a route, reading the information and storing the information read from each tag as a function of the location of the tag relative to a waypoint.

In one embodiment, the mobile asset is large machinery having wheels for easy movement. The aerial vehicle has an onboard GPS, the tag is an RFID tag and the reader is an RFID reader.

In another embodiment of the invention, a camera is disposed on the aerial vehicle. The camera performing at least one of identification of the vehicle or providing an image of the asset, to confirm that the asset corresponds to the information read from the vehicle.

During operation a physical area for storing mobile assets is geofenced. The geofenced area is then divided into two or more waypoints; a path across two or more waypoints defining a route. A mobile asset is disposed in a physical area corresponding to a first waypoint, the mobile asset having a tag with information identifying the asset thereon. An aerial vehicle is provided. the aerial vehicle flies along the route by flying to a first waypoint, stopping a the first waypoint, activating a tag reader and starting a timer, reading the information from the tag when the mobile asset is present at the first waypoint; and moving to a second waypoint at the end of the first to occur of the reading of a tag and the end of the predetermined time period counted by the timer.

In a further embodiment, the aerial vehicle transmits the read information to the central database.

In another embodiment of the invention the aerial vehicle stops at the second waypoint, activates the tag reader and starts the timer, reading the information from the tag when a mobile asset is present at the second waypoint; and moves from the second waypoint at the end of the predetermined time period counted by the timer.

Additional features and advantages of the present invention are described in, and will be apparent from, the following Detailed Description of the Invention and the figures.

BRIEF DESCRIPTION OF THE DRAWINGS

The features and advantages of the present invention will become more readily apparent from the following detailed description of the invention in which like elements are labeled similarly and in which.

DETAILED DESCRIPTION OF THE PREFERRED EMBODIMENTS

The system is initialized by creating a geofenced area in which mobile assets are to be stored over time. The geofenced area is divided into a subset of geofenced locations or waypoints. In a preferred non limiting embodiment, the geofenced area is a yard or parking lot, and the mobile assets are large items, usually stored outdoors which have wheels, or a large asset such as a generator, by way of non limiting example, on a trailer, making them mobile and easily moveable amongst locations within the geofence and to outside of the geofence.

Figure 1:
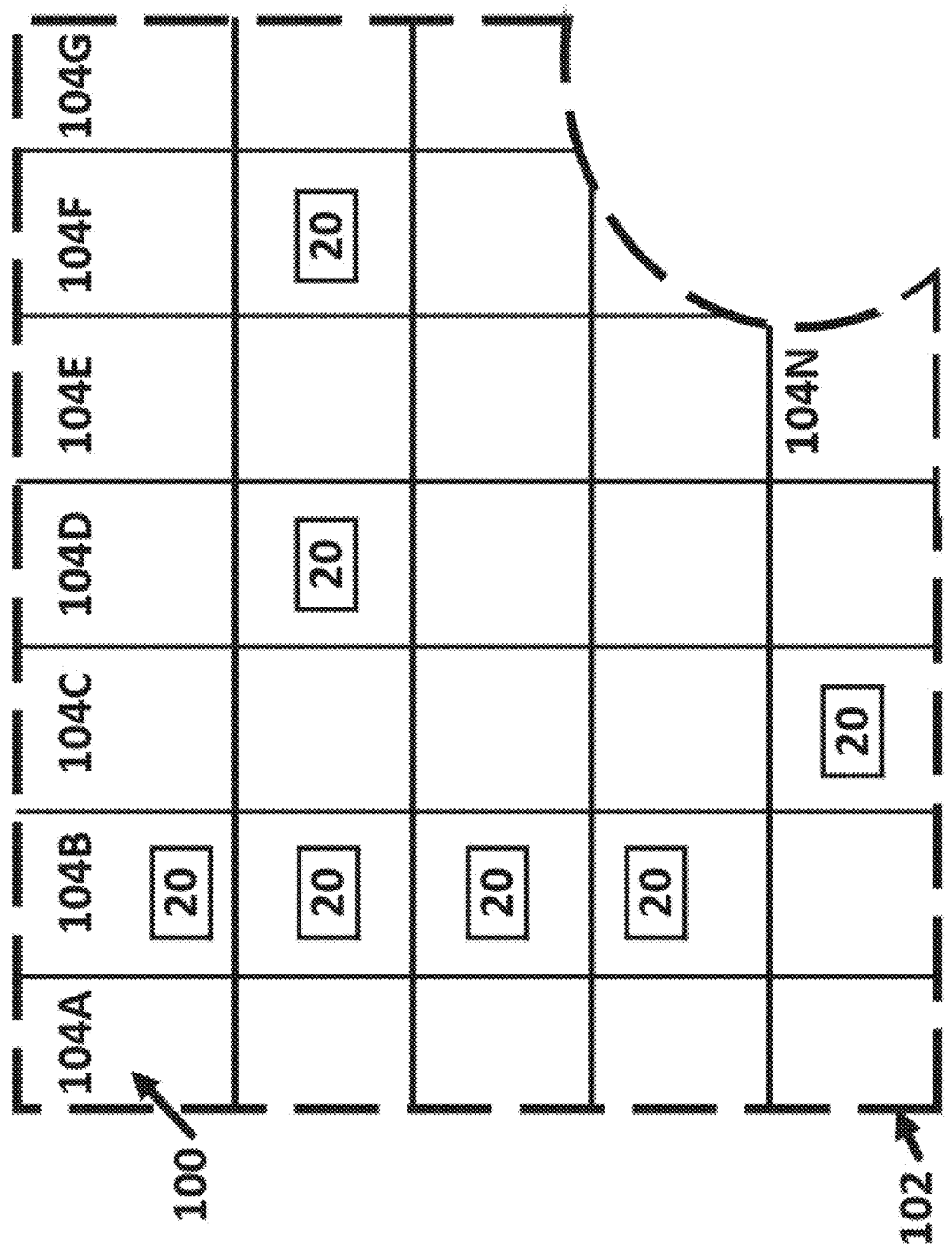
FIG. 1 is a schematic view of an area in which inventory is taken in accordance with the invention.

As seen in FIG. 1, one embodiment of the present invention includes a geofenced area 100 which may be of any shape, including an irregular shape as shown. Geofenced area 100 is defined by an outer boundary 102 forming a perimeter. The area within perimeter 102 is subdivided into a plurality of defined geolocations 104A-104N, also referred to as waypoints; each having an area sufficient to contain a particular mobile asset 20. Each geolocation104A need not have the same shape or size of another geolocation 104N. As will be described below each geolocation 104 will define one or more waypoints 104 along a route for an aerial vehicle 10. As known in the art geofence 100 and waypoints 104A-104N may be stored in database 38.

Figure 2:
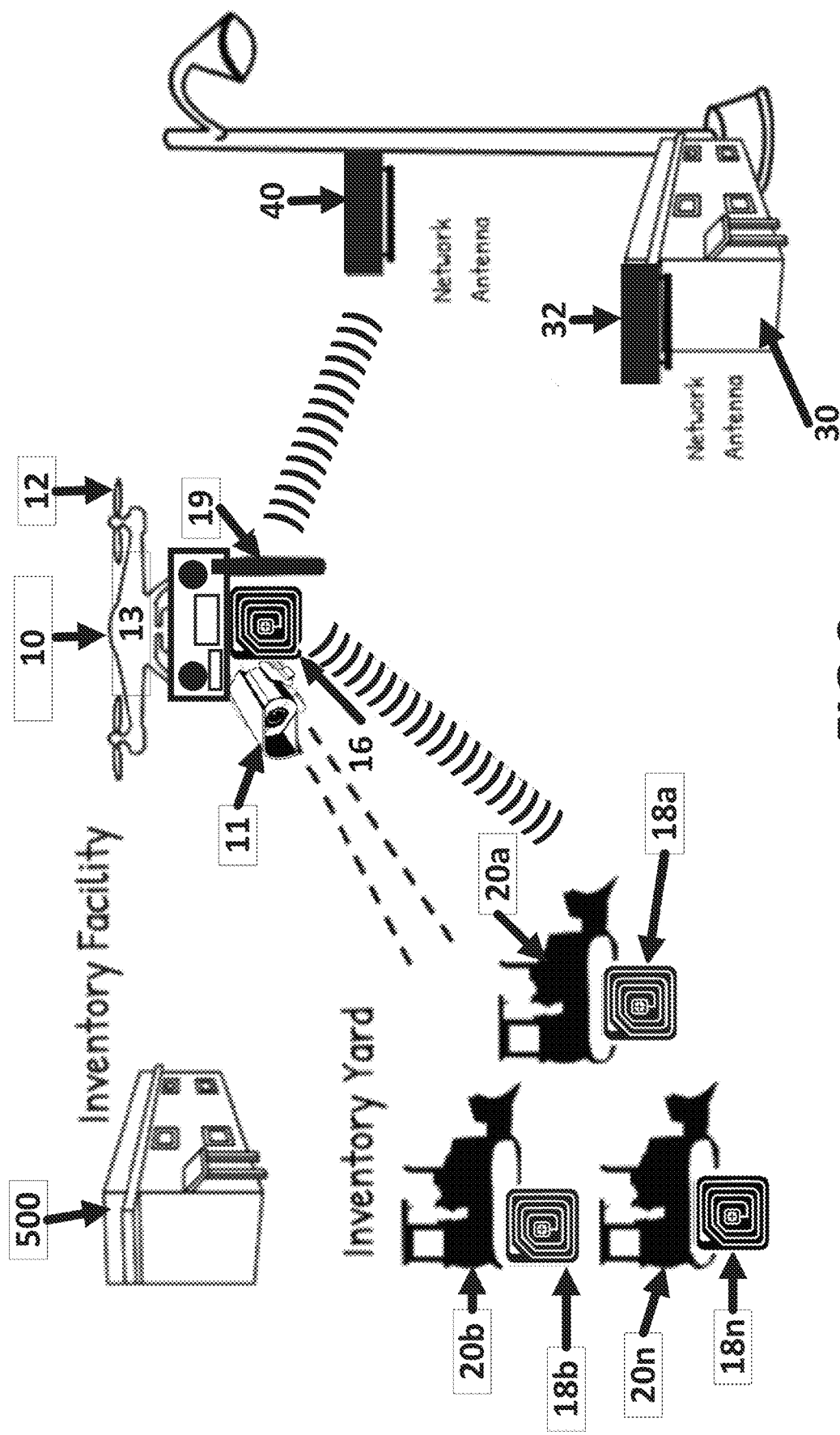
FIG. 2 is a schematic view of an aerial vehicle and mobile asset constructed in accordance with the invention.
Figure 3:
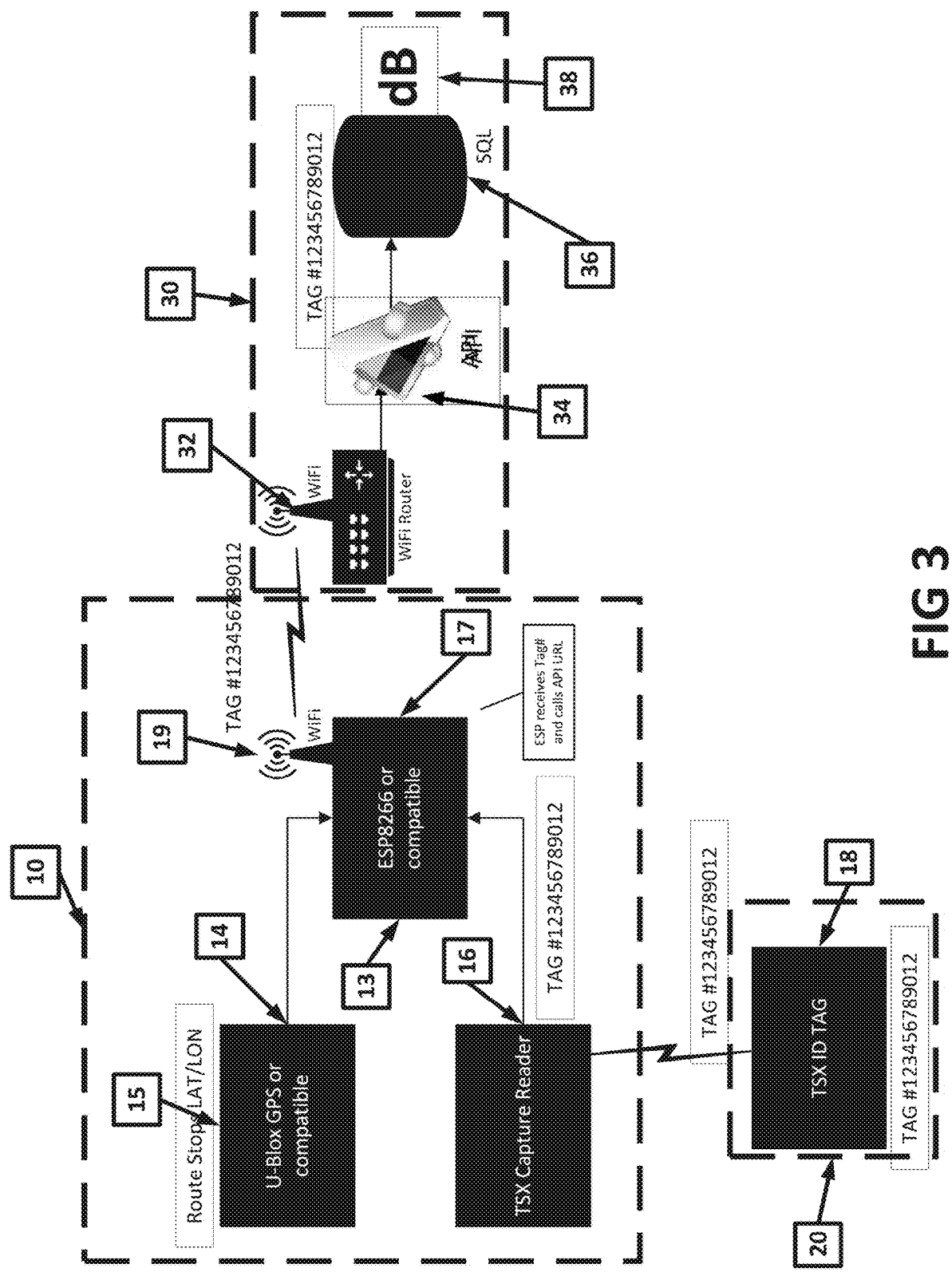
FIG. 3 is a schematic view of the system for taking inventory over a wide area constructed in accordance with the invention.

Reference is now made to FIGS. 2 and 3 wherein the physical system for operation within geofence 100 is provided. A plurality of mobile assets 20a-20n, a bull dozer in this non limiting example, is a large outdoor mobile device capable of easy movement. Each mobile asset 20a, for ease of description, is provided with a readable tag 18 containing information necessary to inventory mobile asset 20a for example any arbitrarily assigned identification number (ID) such as #123456789012. In a non limiting example the information may include the make and model of the asset 20a, even the VIN number. Tag 18 may also include the geolocation 104 to which mobile asset 20a has been assigned. While tag 18 may be any machine readable tag, including optically readable, Wi-Fi, cellular, laser, or the like; in a preferred non limiting embodiment tag 18 is an RFID tag.

An aerial vehicle 10 having a chassis 13 and at least one propeller 12 flies a route through geofenced yard 100. The route is defined by two or more waypoints 104, and may be stored in database 38 and/or on board aerial vehicle 10. Aerial vehicle 10 includes electronics such as a reader 16 capable of reading tag 18; an RFID reader in a non limiting exemplary embodiment. Aerial vehicle 10 also includes a GPS receiver 14 for determining, in real time, the global position of aerial vehicle 10 as it travels. Aerial vehicle 10 includes an on board timer 15 for counting an elapsed time upon arrival at a waypoint as determined by GPS receiver 14 and a camera 11. Aerial vehicle 10 also includes a wireless communication transceiver for communication with a base station 30 or intermediary network antennas 40; and internet of things ("IoT") capabilities.

In one nonlimiting embodiment of the invention camera 11 has multiple uses. First it captures an image of waypoint 104 to confirm whether the waypoint is empty or has an item therein, as a check on the results from reader 16. In one embodiment the image may be compared to an image of the expected occupant of waypoint 104 as confirmation not only that something is there, but the expected item is in the waypoint. However, camera 11 may be sued as the reader. Using OCR technology known in the art, camera 11 could capture a visual identifier such as a number or OCR code disposed on the inventoried item itself; such as a visible number 2424 on the roof of a bulldozer canopy. This number could then be used in the same manner as the RFID tag information discussed above and below.

While aerial vehicle 10 may have an on board memory and processor for taking inventory in real time, in a preferred embodiment, aerial vehicle 10 includes an onboard Wi-Fi transceiver 17 and antenna 19 for communicating with network antennas 32, 40 to dashboard processed by a central processing station 30. While the preferred embodiment is a Wi-Fi transceiver 17, any wireless communication structure between aerial vehicle 10 and processing station 30 may be used, such as cellular, radio, laser, blue tooth, optical or the like.

Central processing station 30 includes a Wi-Fi router 32 for receiving transmissions from one or more aerial vehicles 10. The data received from aerial vehicles 10 is then processed by an API 34 and an SQL server 36 to determine an inventory by operating on the tag reads received from the one or more aerial vehicles 10. The determined inventory may be stored in the database 38.

In a preferred, non limiting embodiment, one or more network antennas 40, are disposed within the yard to receive signals from aerial vehicle 10 and relay the information to receiver 32 of central processing station 30. In this way the integrity of any signal from aerial vehicle 10 is not lost over distance. Furthermore by using drones 10 and antennas 40 positioned about the geofenced area, reliable line of sight connectivity is assured.

Generally, aerial vehicle 10 flies a route, either stored on board aerial vehicle 10 or received from central processing station 30, across two or more waypoints 104 within geofence perimiter102. As aerial vehicle 10 arrives at each waypoint 104, aerial vehicle 10 begins a process to read a tag 18. If a tag 18 is read, the information is sent to central processing station 30 to be operated upon. If no tag is read; there is no response to the read signal from RFID reader 16 on board aerial vehicle 10, then this information is also sent to central processing unit 30 to be treated as an asset which has been removed from its expected position, or the yard entirely. Camera 11 on board aerial vehicle 10 is used to photograph waypoint 104 at each reading as confirmation that the reading is accurate, i.e an asset really exists when a tag 18 is confirmed to be read, or that there is no asset 20 at the waypoint 104 when reader 16 reports no tag read.

Figure 4:
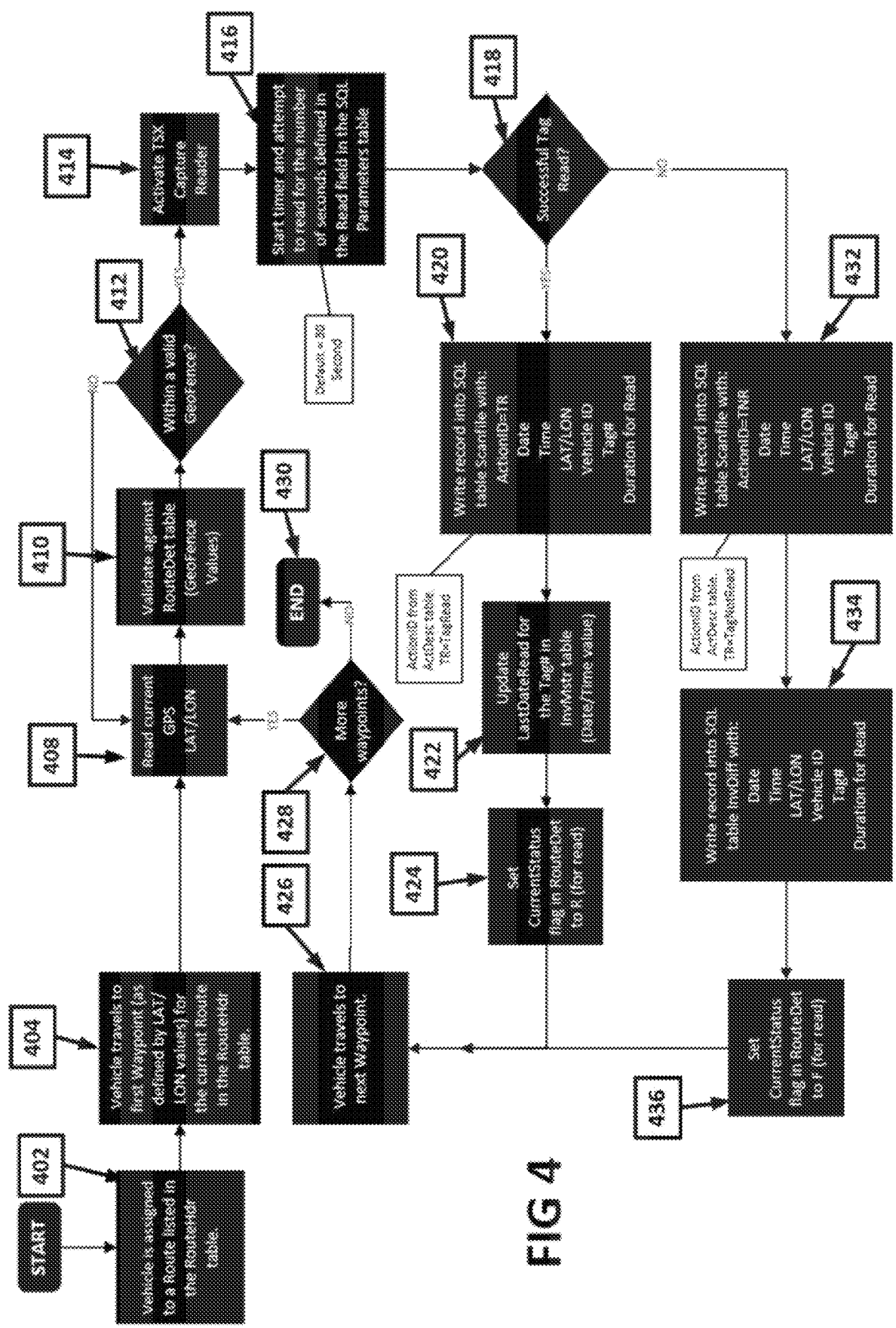
FIG. 4 is a flow chart for operation of the system in accordance with the invention.

More specifically, as detailed in FIG. 4, in a step 402 aerial vehicle 10 is assigned a route by central processing station 30, and the coordinates of the waypoints 104 to be inspected are provided. The route is transmitted as sets of latitude and longitude coordinates corresponding to the waypoints 104 to be inspected. In a step 404 aerial vehicle 10, utilizing on board GPS 14, travels to the first waypoint 104 along the route.

In step 408 aerial vehicle 10 is continuously confirming its current latitude and longitude and is comparing the current determined position coordinates against the values associated with the route in a step 410. Aerial vehicle 10, utilizing information stored in database 38, is continuously determining whether a current position corresponds to a way point 104, within the geofence of that waypoint 104, in a step 412. If not, the process repeats itself beginning at step 408. If aerial vehicle 10 confirms that it is within the geofence of a waypoint 104, then reader 16 is activated in a step 414 and clock 15 begins a timer to count a predetermined dwell time at waypoint 104.

If there is a successful tag read as determined in step 418 then information read from tag 18 is transmitted to central processing station 30 to be operated upon by server 36 and stored in database 38. In a preferred non limiting embodiment the information transmitted by aerial vehicle 10 may include confirmation that a successful read occurred ("Action ID=TR), the date, time, a position (latitude and longitude) of the successful read, Vehicle ID, Tag number (Tag #) and Duration of the Read as determined by the timer of clock 15.

Database 38 stores the geofence 100 as well as routes across waypoints 104 for the operation of aerial vehicle 10. As will be discussed in more detail below, server 36 receives data from aerial vehicles 10 and can determine a total inventory, changes in inventory, changes in asset location within geofence 100, and even errors in inventory by comparing new data from aerial vehicle 10 with data stored in database 38. In a preferred non limiting embodiment camera 11 photographs each waypoint104 along the route, in response to confirmation of the position, or triggering of clock 15, to provide confirmation that what was read from the tag 18 corresponds to what is actually in the physical location. This reduces reading errors, and may prevent fraud. Or as discussed above, the image may contain the identifying "tag" information to be processed.

In a step 422 server 36 updates the inventory data for the read waypoint 104 in database 38 with the newly read information including a date time value of the read. In a step 424 the status of the read inventory data is updated to indicate that the asset 20 at waypoint 104 has been read. While this is occurring, aerial vehicle 10 travels to a next waypoint 104 on the route in a step 426. In a step 428 aerial vehicle 10 determines whether there are more waypoints on the route. If yes, the process returns to step 408 to complete the cycle. If not, the process ends and aerial vehicle 10 returns to its start position, unless instructed to go to another location.

If in step 418 it is determined that there is no successful read, and clock 15 has counted to a predetermined time period, then it is assumed that the interrogated waypoint 104 is empty. A picture is taken by camera 11 of the waypoint 104 to confirm that the waypoint 104 is in fact empty and that it is not a failure of the reader 14 or tag 18. Reader 14 interrogates waypoint 104 for the entire period. Clock 15 and the predetermined time period are utilized to provide a sufficient time period to read tag 18. Once the predetermined time period, thirty seconds in the preferred non limiting embodiment, has elapsed the system assumes that waypoint 104 is empty of assets and aerial vehicle 10 continues its route. In this way autonomous operation of aerial vehicle 10 is provided as o aerial vehicle 10 moves along the route as a result of a successful read or the timing out.

In a step 432 the non read is transmitted to central processing station 30 where server 36 records the tag not read (Action ID=TNR) occurrence in database 38. As with a successful read the information transmitted by aerial vehicle 10 may include, the date, time, a position (latitude and longitude) of the read, Vehicle ID, Tag number (Tag #) and Duration of the Read as determined by the timer of clock 15. A null set of data is transmitted as the vehicle ID and Tag number to be operated on by server 36. These values are written into database 38 in a step 434.

In a step 436 the status of the read inventory data is updated to indicate that the waypoint did not have a read of an asset 20. While this is occurring, aerial vehicle 10 continues along the route to a next waypoint 104 in a step 426. Returning to step 428 aerial vehicle 10 determines whether there are more waypoints 104 on the route. If yes, the process returns to step 408 to complete the cycle. If not, the process ends.

It should be noted that the route need not be a serial progression through waypoints 104A-N, or in any particular order. The route may be determined and programmed into aerial vehicle 10 as a function of which portions of the geofenced area needs to be inventoried. it is even possible given the information stored in database 38 to create a route that only searches for the expected waypoints 104 containing a particular type of item; a dump truck or backhoe by way of non limiting example.

It should also be understood that the above example was described as a geofenced perimeter 102 having waypoints 104A-104N therein. However, it is well within the scope of the invention to treat each waypoint 104 as distinct geofenced areas; the route of aerial vehicle 10 moving from geofenced area to geofenced area to perform tag reading as discussed above.

When each waypoint 104 is its own geofence then the route simultaneously is a series of waypoints 104A-N, as well as two or more geofences. Perimeter 102 now defines each waypoint 104, a route remains a plurality of waypoints 104 in a predetermined path, but also includes a plurality of corresponding perimeters. In this embodiment aerial vehicle still operates in accordance with the method of FIG. 4, but in step 412 when aerial vehicle 10 confirms the position within a geofence 100, it is also confirming the presence within waypoint 104.

Operation remains the same. Once confirmation as to position is made then reader 16 and timer 13 are activated in steps 414, 416. If a successful tag read is made as determined in step 418, the data is recorded and transmitted in step 420, updated in steps 422, 424 and aerial vehicle 10 travels to the next geofenced waypoint in step 426 and determines whether the route is completed in step 428.

Similarly, if no tag is detected in step 418, then data confirming the status is recorded, transmitted and updated in steps 432,434, and 436. The process returns to step 426 and aerial vehicle 10 travels to the next geofenced waypoint in step 426 and determines whether the route is completed in step 428.

As seen from the above, the system is capable of operating using two distinct geofence validations. The first is a perimeter102 of a large geofence 100 which creates a zone around the entire area being inspected. The perimeter 102 of the geofence 100 zone is used by the system 100 to activate an abort to the travel/flight plan, or an error/warning that the vehicle has left the geofence 100 zone by crossing perimeter 102. The second geofence may consist of any smaller area, including each waypoint 104, that must be within the perimeter 102 of geofence zone100 and is used as waypoints 104 for the vehicle to travel. When the vehicle is within the geofence waypoint 104, the system100 activates the data-capture technology (RFID, Image Capture, Bluetooth . . . etc.) to count/read the asset.

It should be noted that the above example was defined in terms of aerial vehicle 10. However it is within the scope of the invention to provide a mobile ground based drone to traverse the route.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:
1. A system for taking inventory of mobile assets across a wide area comprising:
 a database, parameters of a geofenced area, the geofenced area being divided into one or more waypoints and a route defined as a path within the geofenced area across two or more waypoints being stored in the database;
machine readable information about a mobile asset;
at least one mobile asset disposed at a position corresponding to at least one waypoint, the mobile asset including the machine readable information about the mobile asset thereon; and
an aerial vehicle configured to traverse the geofenced area;
a reader disposed on the aerial vehicle and configured to read the machine readable information, the aerial vehicle configured to fly along the route within the geofenced area; the reader reading the information and storing the information read from each waypoint as a function of the location of the information relative to at least one of the two or more waypoints; and the aerial vehicle configured to determine that the aerial vehicle has crossed the geofence, and ceasing operation as a function thereof when travelling in a first direction.

2. The system for taking inventory of mobile assets of claim 1, wherein the reader is an RFID tag reader and the machine readable information being stored on a tag disposed on the mobile asset, the tag reader communicating with each tag along the route.

3. The system for taking inventory of mobile assets of claim 1, wherein the reader is a camera, and the machine readable information is an optical code.

4. The system for taking inventory of mobile assets of claim 1, where in the database is on the aerial vehicle.

5. The system for taking inventory of mobile assets of claim 1, further comprising a clock for counting an elapsed time, the clock beginning an elapsed time count upon the aerial vehicle entering a waypoint, the aerial vehicle configured to move to a next waypoint upon the first to occur of a successful read and the clock counting a predetermined elapsed time.

6. The system for taking inventory of mobile assets of claim 1, further comprising at least a second waypoint within the geofenced area.

7. The system for taking inventory of an asset of claim 6, wherein the reader is an RFID tag reader and the machine readable information being stored on a tag disposed on the mobile asset, the tag reader communicating with each tag along the route.

8. A method for taking inventory of mobile assets across a wide area comprising the steps of:
geofencing a physical area for storing mobile assets therein; the geofenced area being divided into two or more waypoints;
defining a route having a path across two or more waypoints;
providing a mobile asset disposed in a physical area corresponding to a first waypoint, the mobile asset configured to have information identifying the asset thereon;
providing an aerial vehicle, the aerial vehicle configured to fly along the route by flying to a first waypoint, stopping at the first waypoint, activating a reader and starting a timer, reading the information from the tag when the mobile asset is present at the first waypoint; and
moving to a second waypoint at the first to occur of the reading of the information and the end of the predetermined time period counted by the timer; and the aerial vehicle configured to determine that the aerial vehicle has crossed the geofence, and ceasing operation as a function thereof when travelling in a first direction.

9. The method of claim 8, wherein the reader is an RFID tag reader and the machine readable information being stored on a tag disposed on the mobile asset, the tag reader communicating with each tag along the route.

10. The method of claim 9, the reader is a camera, and the machine readable information is an optical code.

11. A method for taking inventory of mobile assets across a wide area comprising the steps of:
dividing an area for storing mobile assets into two or more waypoints; each waypoint being defined by a geofence;
defining a route having a path across two or more waypoints;
providing a mobile asset disposed in a physical area corresponding to a first waypoint, the mobile asset having information identifying the asset thereon;
providing an aerial vehicle, the aerial vehicle configured to fly along the route by flying to a first waypoint, stopping at the first waypoint, activating a reader and starting a timer, reading the information from the mobile asset when the mobile asset is present at the first waypoint; and moving to a second waypoint at the first to occur of the reading of the information and the end of the predetermined time period counted by the timer; and the aerial vehicle configured to determine that the aerial vehicle has crossed the geofence, and ceasing operation as a function thereof when travelling in a first direction.

12. The method of claim 9, wherein the reader is an RFID tag reader and the machine readable information being stored on a tag disposed on the mobile asset, the tag reader communicating with each tag along the route.

13. The method of claim 9, the reader is a camera, and the machine readable information is an optical code.

* * * * *